INVENTORS.
Edmund J. Gorsek, Jr.,
BY Charles C. Patton,
Brown, Jackson,
Boettcher & Dienner
attys.

REEL MOUNTING

Filed July 17, 1963

INVENTORS
Edmund J. Gorsek, Jr.
Charles C. Patton,
BY Brown, Jackson, Boettcher & Dienner
attys Aug. 3, 1965 E. J. GORSEK, JR ETAL 3,198,454

REEL MOUNTING

Filed July 17, 1963 3 Sheets-Sheet 3

INVENTORS
Edmund J. Gorsek, Jr.,
Charles C. Patton,
BY Brown, Jackson,
Boettcher & Dienner
Attys.

United States Patent Office 3,198,454
Patented Aug. 3, 1965

3,198,454
REEL MOUNTING

Edmund J. Gorsek, Jr., and Charles C. Patton, Springfield, Ill., assignors to Sangamo Electric Company, Springfield, Ill., a corporation of Delaware Filed July 17, 1963, Ser. No. 295,638
7 Claims. (Cl. 242—68.3)

The present invention relates to an improved construction of reel mounting, generally of the power driven type, which is particularly intended for mounting magnetic tape reels employed for holding the tape of tape recorders. However, as will hereinafter appear, our improved reel mounting is also applicable to mounting of motion picture reels and to other types of reels holding different forms of continuous strip material.

The above mentioned magnetic tape records have a wide range of uses, but more lately are being extensively used as components of computing machines, data processing machines employing reel wound magnetic tape to function in the memory system or control system of the machine. In such uses, it is frequently desirable to be able to quickly remove the tape reel from its mounting so as to permit the ready substitution of other reels for recording or reproducing different memory functions, control functions, etc. It is important to be able to make this interchange of reels quickly and easily so as not to delay the operation of the machine. It is also important that an effective driving relation be maintained between the power drive of the reel mount and the reel itself.

One of the principal objects of the invention is to provide a reel mounting in which the above interchange of reels can be quickly and easily effected by the mere rotation of a front knob projecting from the front side of the reel. A relatively short turn of this front knob in one direction releases the reel from the mounting, and a relatively short turn of this knob in the other direction clamps the reel back on the mounting. This clamped engagement is frictional so that there is no necessity of effecting alignment between any driving key and corresponding keyway provided in the reel and its mounting hub. The above novel type of front knob release has the advantage of avoiding the necessity of removing any component parts, which can often become mislaid or lost; and has a still further advantage of having no rear releasing parts which have to be released or manually manipulated from the back or inner side of the reel mounting.

Another object of the invention is to provide the aforementioned front releasing knob with a unique arrangement of reel gripping fingers which retract into the hub in a reel mounting or dismounting operation and which project outwardly from the hub for firmly securing the reel upon the reel mount.

Another object of the invention correlated to the above extensible and retractible fingers, is the provision of improved shifting cam means which acts on the manual releasing knob to axially shift the knob inwardly or outwardly in synchronism with the outward projection or the inward retraction of the reel gripping fingers. Thus, by virtue of the correlation between the radial movement of the gripping fingers and the axial shifting movement of the releasing knob, each of the gripping fingers has two components of motion during the operation of gripping the reel and during the operation of releasing the reel. More specifically, during the initial part of the reel gripping rotary movement of the front knob the gripping fingers move radially outwardly of the knob into projected positions where they can engage the side of the reel; following which during the remaining part of the reel gripfirm compression engagement against the outer face of the reel. Conversely, in the reel releasing operation the initial part of the rotary movement of the knob in the reverse direction causes axial shifting movement of the knob in an outward direction to carry gripping fingers away from engagement against the side of the reel; following which the continued rotation of the knob in this same reverse direction retracts the gripping fingers radially into the knob so that the reel can be easily pulled outwardly over the outer surface of the knob.

Another object of the invention is to have the aforesaid cam means exert a yieldable detent action for releasably retaining the manually operated knob at each limit of its arcuate movement.

Other objects, features and advantages of the invention will be apparent from the following detailed description of one preferred embodiment thereof. In the accompanying drawings illustrating such embodiment:

Figures 6, 7, 8, 9:
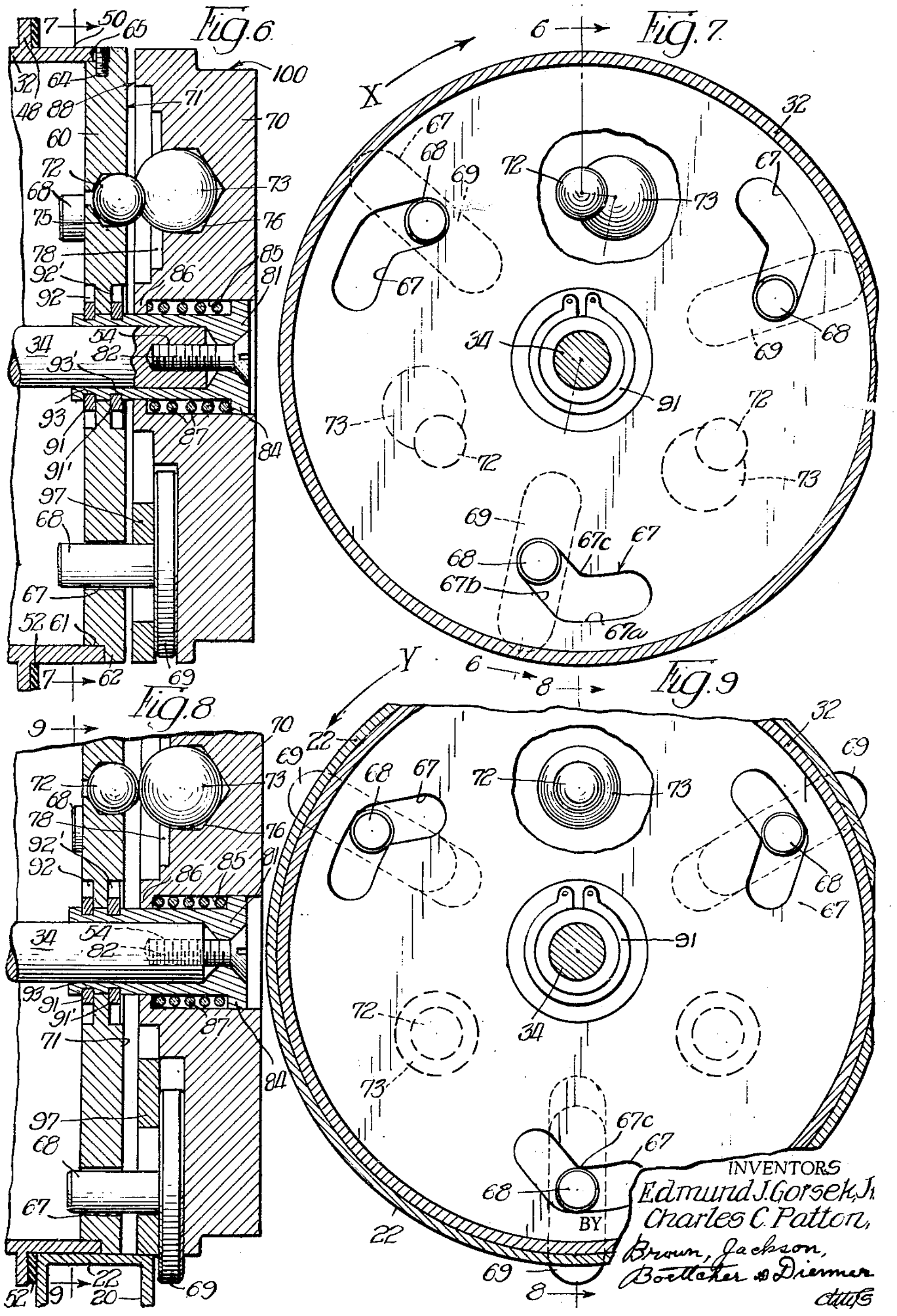

FIGURES 6 and 7 are fragmentary companion views showing one position of the apparatus, FIGURE 6 being taken approximately on the line 6—6 of FIGURE 7, and FIGURE 7 being taken approximately on the line 7—7 of FIGURE 6, these figures showing the axially shifted position and the angular position of the knob when the gripping fingers are completely retracted.

Figures 10, 11:
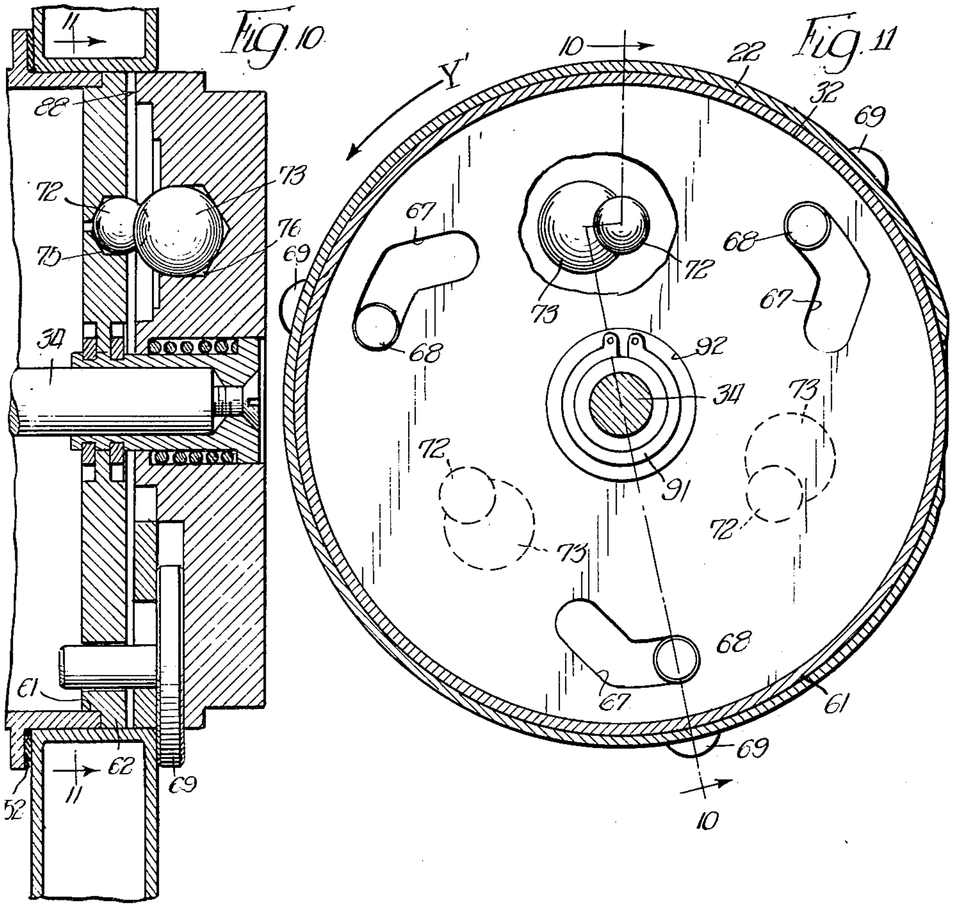
Figure 1:
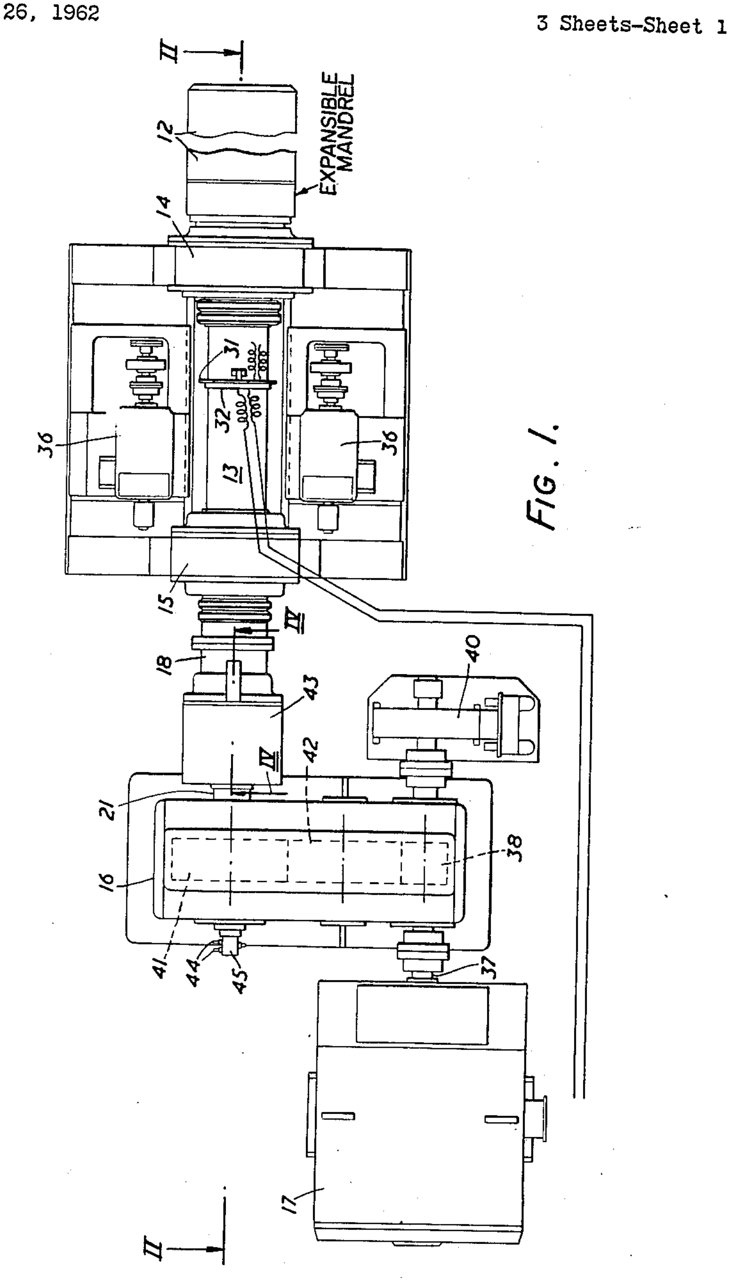

FIGURES 8 and 9 are like views showing the axially shifted position and the angular position of the knob when the gripping fingers have been projected outwardly but before they have been shifted in an axial direction against the side of the reel, and FIGURES 10 and 11 are similar related views showing the axially shifted position and the angular position of the knob when the gripping fingers have been shifted axially into pressure engagement against the side of the reel.

Figure 1:
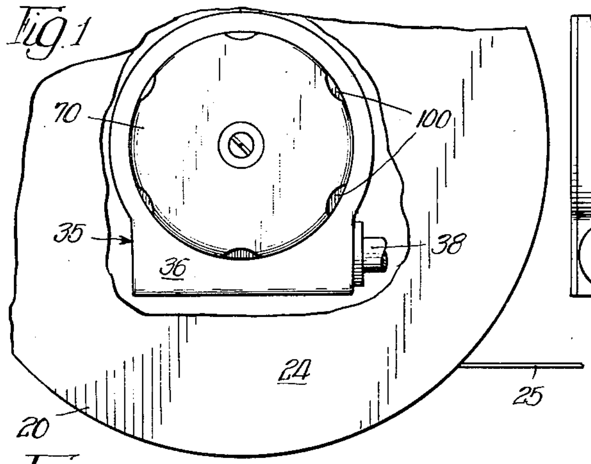
FIGURE 1 is a fragmentary or broken-away front elevational view of our improved reel mounting on a reduced scale.
Figure 2:
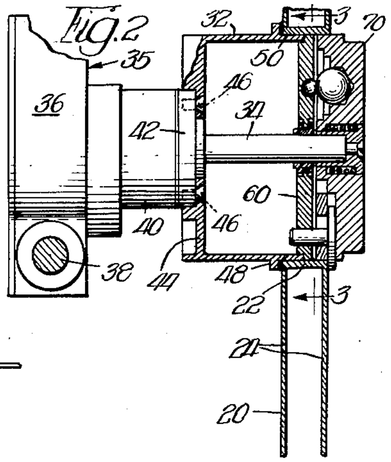
FIGURE 2 is a side view of the same, partly in elevation and partly in section.
Figure 3:
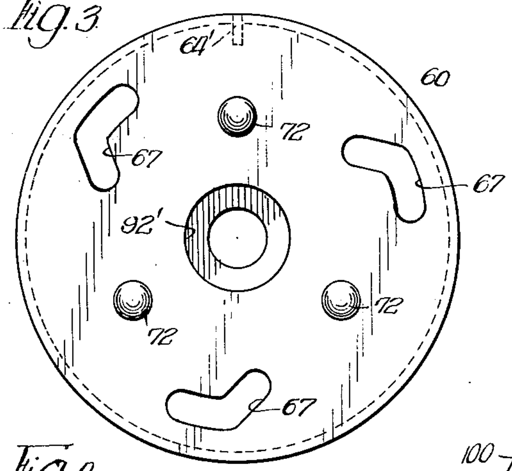
FIGURE 3 is a front elevational view of the cam disc or cam plate which is fixedly mounted within the front end of the power driven mounting drum, corresponding to a section taken approximately on the plane of the line 3—3 of FIGURE 2, looking rearwardly.
Figure 5:
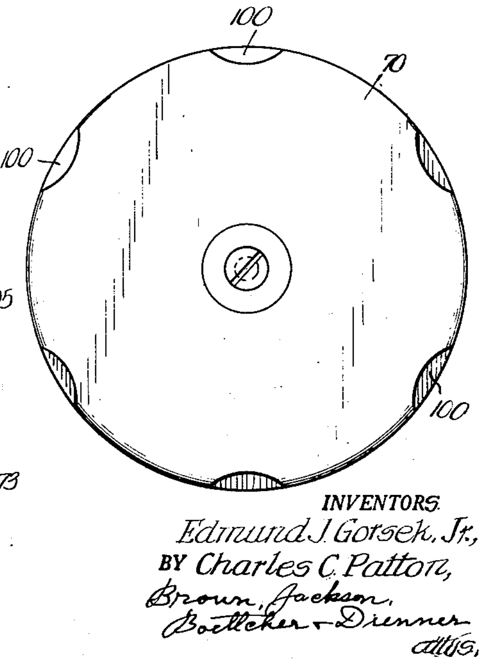
FIGURE 5 is a front elevational view of the control knob.
Figure 4:
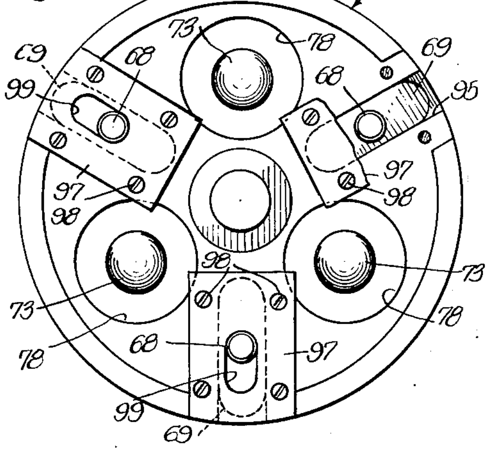
FIGURE 4 is a rear face elevational view of the manually rotatable front control knob, corresponding approximately to a section taken on the same plane 3—3 of FIGURE 2, but looking in the reverse direction, or forwardly.

Referring first to FIGURES 1 and 2, a conventional tape reel, designated 20, is fragmentarily illustrated on a reduced scale, this reel comprising a central hub 22 and the two spaced circular side walls 24 extending outwardly from the hub. The tape 25 wound upon this reel 20 is generally of a magnetic recording type, but as previously mentioned, our improved reel mounting might also be adapted to the mounting of motion picture reels and the like.

Our improved reel mounting comprises a cup-shaped cylindrical drum or shell 32 having a stem or spindle 34 extending axially thereof. These parts are rotated conjointly from a power drive unit 35 comprising a worm gear reduction housing 36 into which enters a drive shaft 38 which mounts a worm gear thereon within the housing. This worm gear drives a worm wheel mounted upon an arbor journaled in bearings in a forwardly extending bearing hub or housing 40. The aforementioned against the side of the reel only after said fingers have been projected outwardly from said knob.

3. In reel mounting apparatus, a combination of a power driven rotatable spindle and a power driven rotatable mounting hub having a reel mounting seat thereon, an abutment flange at the inner end of said reel seat, a friction drive washer of compressible material bearing against said abutment flange, said drive washer being adapted to engage the inner surface of a reel when a reel is pressed inwardly on said reel seat, a cam plate rotating with said mounting hub, a manually operable knob mounted on said spindle, a thimble interposed between said spindle and said knob, spring means carried by said thimble normally tending to axially shift said knob in an inward direction relatively to said reel seat, gripping fingers carried by said knob and arranged for projecting and retracting movements relatively thereto, cam slots of substantially dog-leg pattern formed in said cam plate, cam follower pins carried by said gripping fingers and projecting into and following said dog-leg cam slots for causing projecting and retracting movements of said gripping fingers pursuant to rotational motion of said knob relatively to said cam plate, a first ring of forwardly facing cam balls carried by said cam plate, and a second ring of rearwardly facing cam balls carried by said knob, said two rings of cam balls being of substantially the same diameter and adapted to have axial displacing camming contact with each other in the rotational motion of said knob for permitting said spring means to shift said knob and said gripping fingers in an inward direction to exert lateral pressure against a reel during the latter part of the rotary control movement of said knob for pressing a reel inwardly into firm pressure engagement with said friction drive washer.

4. In reel mounting apparatus, a combination of a rotatable reel mounting hub, a manually operable knob mounted so as to be capable of rotary movement and axially shifting movement relatively to said hub, gripping fingers associated with said knob and moving axially therewith, means for projecting said gripping fingers outwardly into positions to engage the outside of the reel, spring means tending constantly to axially shift said knob and said gripping fingers in an inward direction relatively to said hub, and cam mechanism operative during one part of the rotary motion of said knob to cause axial shifting motion of said knob and said gripping fingers in an axially outward direction in opposition to said spring means, and operative during another part of the rotary motion of said knob to permit said spring means to cause axial shifting motion of said knob and of said gripping fingers in an axially inward direction.

5. In reel mounting apparatus, a combination of a rotatable reel mounting hub, a rotatable spindle, a manually operable control knob permanently mounted on said spindle for rotational motion and for axial shifting motion on said spindle and adapted to pass through the central mounting hole of the reel to be mounted on said hub, gripping means associated with said control knob operative to be projected outwardly therefrom to exert lateral pressure against the side of the reel, means limiting the rotational motion of said knob under manual operation to two rotatively spaced end positions, cam means for effecting axial shifting movement of said knob, spring means cooperating with said cam means whereby to function as yieldable detent means for yieldably retaining said knob in each of its two rotatively spaced end positions, said cam means comprising a first ring of inner balls carried by said mounting hub, a second ring of outer balls carried by said knob, said two rings being concentric and of substantially the same diameter whereby in the manual rotation of said knob relatively to said mounting hub said second ring of outer balls is adapted to ride upwardly on the front slopes of the inner balls of said first ring for axially shifting said knob outwardly, and in the continued manual rotation of said knob in the same direction said second ring of outer balls is adapted to ride downwardly on the back slopes of the inner balls of said first ring for permitting inward shifting of said knob under the action of said spring means, whereby said balls and said spring means function as said yieldable detent means.

6. The combination recited in claim 2, wherein said second or last recited cam means comprises an inner ring of balls carried by said mounting hub, and an outer ring of balls carried by said knob, said two rings of balls being operative to exert axial displacing camming contact with each other in the rotation of said knob.

7. The combination recited in claim 4, wherein said cam means comprises a first ring of forwardly facing cam balls carried said mounting hub, and a second ring of rearwardly facing cam balls carried by said manually operable knob adapted to coact with said first ring of balls to cause the aforesaid axial shifting motion of said knob and said gripping fingers in said axially outward direction.

References Cited by the Examiner

UNITED STATES PATENTS

| | | | |
|---|---|---|---|
| 1,394,177 | 10/21 | Jones | 287—53 |
| 1,946,455 | 2/34 | Davis | 242—68.3 |
| 2,042,171 | 5/36 | Durand et al. | 242—68.3 |
| 2,537,263 | 1/51 | Fogle | 242—68.3 |
| 2,659,542 | 11/53 | Steuber | 242—68.3 |

JORDAN FRANKLIN, *Primary Examiner.*

Aug. 3, 1965 H. L. F. BOND 3,198,455

COILER FOR COILING STRIP MATERIAL

Filed Jan. 26, 1962 3 Sheets-Sheet 1

INVENTOR
H. L. F. BOND
BY Henry C. Westin
ATTORNEY